July 9, 1929.   C. E. MARSHALL   1,719,895

CLIP

Filed Jan. 15, 1929

INVENTOR
Clinton E. Marshall
BY
ATTORNEY

Patented July 9, 1929.

1,719,895

UNITED STATES PATENT OFFICE.

CLINTON E. MARSHALL, OF BROOKLYN, NEW YORK.

CLIP.

Application filed January 15, 1929. Serial No. 332,687.

This invention relates to clips and particularly to devices of this class designed for use in connection with fountain pens, pencils and similar devices, but which may be employed in connection with other articles of manufacture; and the object of the invention is to provide improved means for supporting and actuating clips of the class under consideration, said means involving a mounting member or element arranged in the body in connection with which the clip is supported, and which serves to couple the clip and a spring member cooperating with the clip against displacement for said body; a further object being to provide a device of the class specified involving a combination with the clip a split ring passed through said clip and a U-shaped spring, the crosshead of which is arranged on said ring within the clip structure, one end of the spring cooperating with one end portion of the clip to tensionally control the movement thereof; a further object being to provide a clip for fountain pens or the cap of fountain pens wherein the mounting member is supported and retained in position by a body insertable into the cap and cooperating with said mounting member and also forming a support for tensional means cooperating with said clip; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

It will be understood that my improved clip and supporting means may be mounted or employed in connection with devices of various kinds and classes. For the purpose of illustrating one use of my invention, I have shown in the accompanying drawing, the cap of a fountain pen, the cap being designated at 10 in Fig. 1.

Figure 1:
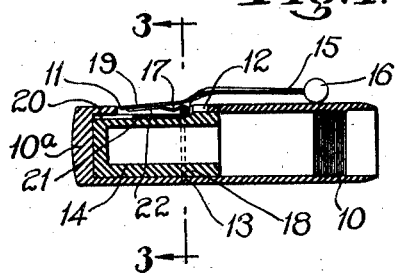
Fig. 1 is a sectional view through the cap of a fountain pen showing one of my improved clips mounted in connection therewith.
Figure 3:
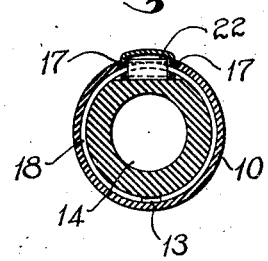
Fig. 3 is a section on the line 3—3 of Fig. 1 and on an enlarged scale.

This cap may be of the usual or conventional form and is modified only in the provision of an elongated aperture 11 adjacent the end wall $10^a$ of the cap and arranged longitudinally thereof, the forward end of said aperture terminating in a comparatively narrow extension 12 arranged centrally thereof. It is also preferred that the cap 10 be provided in the bore thereof as seen in Figs. 1 and 3 of the drawing with an annular groove 13 arranged adjacent the end of the aperture 11 provided with the reduced extension 12. Arranged within the bore is a retaining and backing member 14 which may be in the form of a thimble-shaped body as seen in Fig. 1 of the drawing, or may be tubular as seen at $14^a$ in Fig. 6 of the drawing.

Figure 2:
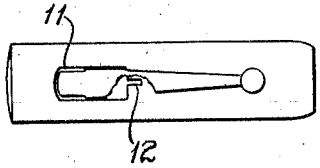
Fig. 2 is a plan view of the structure shown in Fig. 1 with part of the construction broken away.

The clip 15 as seen in Figs. 1 to 3 inclusive is of more or less conventional form and is provided at one end with a cylindrical or ball-like body 16, the shank of the clip being offset adjacent the other end thereof and fashioned to form depending side wall members 17 having opposed apertures through which a split mounting ring 18 is adapted to pass. The end 19 of the clip is comparatively short and is preferably arranged within or substantially within the peripheral contour of the cap 10 and is positioned in the aperture 11. The upper wall of the member 14 where it registers with the aperture 11 is preferably cut out as seen at 20 in order to receive the side walls or flanges 17 of the clip 15 and also to receive and support one side 21 of a U-shaped spring 22, the crosshead $22^a$ of which passes around that part of the ring 18 between the flanges 17. The other end is arranged beneath and cooperates with the end portion 19 of the clip, as seen in Fig. 1.

This spring serves to normally support the spherical or ball member 16 in engagement with the outer wall of the cap 10, and by forcing the end portion 19 inwardly by the thumb or finger of the hand, against the tension of the spring, the member 16 may be moved out of engagement with the wall of the member 10, thus permitting the free and quick attachment and detachment of the fountain pen or the cap thereof with the wall of a garment pocket in connection with which the same is supported.

In attaching the clip ring and spring to the cap 10 having the apertures 11—12 therein, it will be understood that the member 14 is not arranged within the barrel and with the parts insertable; that is to say, with the ring 18 passed through the apertures in the flanges 17, and its split end directly downwardly and with the spring mounted on the ring within the flanges 17 in the general position shown in Fig. 1 of the drawing, and further with the clip body arranged in substantially parallel relation with respect to the longitudinal plane of the ring, and the ring arranged at right angles to the position shown in Fig. 1. The assembled parts are passed into the bore of the cap 10 through the aperture 11 with one side of the ring 18 passing through the aperture 12, after which the unit parts are turned to bring the ring into a right angle position. When in this position, it will be arranged inwardly of the annular groove 13, and by sliding the unit outwardly in the direction of the open end of the cap, the ring 18 will snap into the groove 13, thus retaining the parts in connection with the cap.

Then, the clip 15 is moved from a vertical position to the horizontal position shown in the drawing, and the member 14 is now placed in the bore and moved to the closed end thereof, in which operation, the U-shaped spring will be placed under compression or tension, and the ring 18 will be retained against displacement from the groove 13.

Figure 5:
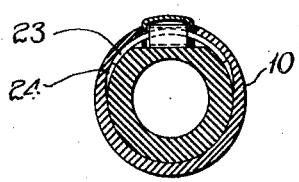
Fig. 5 is a view similar to Fig. 3 but showing a modification.
Figure 6:
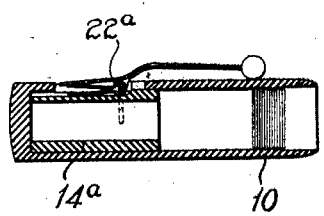
Fig. 6 is a view similar to Fig. 1, illustrating the modification shown in Fig. 5.

In the construction shown in Figs. 5 and 6 of the drawing, instead of employing the ring 18, an arc-shaped pin segment 23 is employed and adapted to be arranged in a groove 24 formed in the cap 10. With this construction, the U-shaped spring 22 or the crosshead 22ª thereof is preferably rounded to form a cylindrical body which will operate to retain the spring against accidental displacement from the pin 23. Otherwise, the structure of the clip device is identical with that shown in Fig. 1 of the drawing, and the operation of the clip will be the same.

Figure 7:
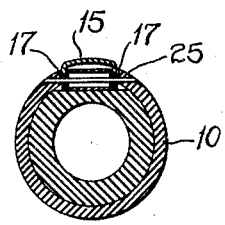
Fig. 7 is a view similar to Figs. 3 and 5 but showing another modification; and, Fig. 8 is a view similar to Fig. 1 showing only a part of the construction and showing a modification.

In Fig. 7 of the drawing, I have shown another slight modification wherein a straight pin 25 is passed transversely through one side portion of the tube 10 and through the apertures of flanges 17 of the clip 15, and also through the crosshead portion of the spring. With this construction, the extending aperture 12 need not be employed, nor is it essential to provide the grooves 13 or 24 in the bore of the cap 10. However, it will be noted that with this form of construction, the removal of the clip parts is not as simple as with the construction shown in the other figures should it be desired to replace or repair anyone of the parts of the clip unit consisting of the clip proper, the spring and the mounting member.

Figure 4:
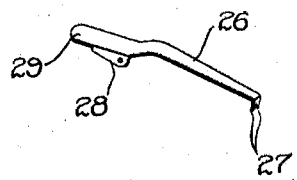
Fig. 4 is a perspective detail view of a modified form of clip which I employ.

In Fig. 4 of the drawing, a slight modification in the construction of the clip is shown, and in this figure, the clip 26 has at its free end and in place of the ball 16, downwardly directed prongs 27 adapted to engage the support in connection with which the clip operates. A pronged end clip may be used without destruction to a garment or other support in that the clip is operated to release the free end thereof from the support. The clip shown in Fig. 4 also has downwardly directed apertured side walls or flanges 28 adjacent the short end 29 thereof, and it will be understood that the type of clip shown in Fig. 4 may be employed in connection with anyone of the forms of construction shown in the other figures.

Figure 8:
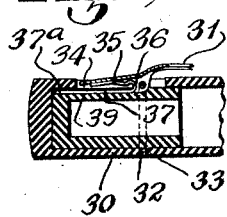

In Fig. 8 of the drawing, I have shown a cap 30 for a fountain pen, which is similar in all respects to the cap 10 shown in Fig. 1 of the drawing. In this construction, a clip 31 similar to the clip 15 is employed, said clip being held in position by a split ring 32 which is supported in a groove 33 in the cap 30 as in Fig. 1 and extends into the aperture 34 formed in one side wall of the cap. The clip 31 is arranged in said aperture. In this construction, instead of arranging or mounting the crosshead of the clip upon the ring as in Fig. 1, a U-shaped spring 35 is employed and one arm 37 of the spring 35 is made longer than the other arm so as to be arranged between the inner wall of the cap 30 and the outer wall of a plug member 38 as seen at 37ª. The member 38 is recessed as at 39 to receive the arm 37. The spring 35 will operate in the same manner as the spring 22 in supporting the cap and/or fountain pen in connection with the outer wall of a pocket or other support.

It will be apparent that my invention is not necessarily limited to any particular means of retaining the ring 18 or pin 23 against displacement or for supporting the spring member employed. As hereinbefore stated, my invention is not necessarily limited to the specific use of the device herein shown and described, and various other changes in and modifications of the construction herein set out may be made within the scope of the appended claims without departing from the spirit of my invention or sacrificing its advantages.

Having fully described my invention, what I claim as new and desire to secure by Letters Patent, is:—

1. A clip of the class described having arranged intermediate its ends, a U-shaped portion, the side walls of said U-shaped portion being apertured, a mounting member arranged in the apertures of said walls and extending therebeyond, and a U-shaped spring, the crosshead of which is looped around said member between said side walls, one end of the spring being arranged adjacent and cooperating with one end portion of said clip.

2. The combination with a tubular body having an elongated aperture in the wall thereof, and a groove in the bore of said body adjacent said aperture, of a clip device arranged longitudinally of said tubular body with one end thereof in said aperture, a split ring adapted to be placed in the groove of said body and passed through said clip to pivotally support the same in connection with said body, and means arranged in the bore of said body for retaining said ring against displacement from said groove.

3. The combination with a tubular body having an elongated aperture in the wall thereof and a groove in the bore of said body adjacent said aperture, of a clip device arranged longitudinally of said tubular body with one end thereof in said aperture, a split ring adapted to be placed in the groove of said body and passed through said clip to pivotally support the same in connection with said body, means arranged in the bore of said body for retaining said ring against displacement from said groove, and a spring disposed between said last named means and the end portion of the clip within said aperture.

4. The combination with a tubular body having an elongated aperture in the wall thereof and a groove in the bore of said body adjacent said aperture, of a clip device arranged longitudinally of said tubular body with one end thereof in said aperture, a split ring adapted to be placed in the groove of said body and passed through said clip to pivotally support the same in connection with said body, means arranged in the bore of said body for retaining said ring against displacement from said groove, and a spring disposed between said last named means and the end portion of the clip within said aperture, said spring being U-shaped in form and the crosshead thereof being passed around said ring.

5. The combination with a spring actuated clip for fountain pen caps, of a split ring for supporting said clip in connection with said cap, said ring being arranged in a groove in the bore of the cap, and means in said bore for preventing the displacement of said ring.

6. The combination with the tubular cap of a fountain pen, of a spring actuated clip unit comprising a clip body, a spring element and a mounting member attachable and detachable as a unit with respect to said cap, and a bushing insertable into the bore of the cap and cooperating with said mounting member and spring element for retaining the same in predetermined position.

7. The combination with the tubular cap of a fountain pen, of a spring actuated clip unit comprising a clip body, a spring element and a mounting member attachable and detachable as a unit with respect to said cap, a bushing insertable into the bore of the cap and cooperating with said mounting member and spring element for retaining the same in predetermined position, and the operating end of the clip being contained within a recessed portion in the wall of said cap.

8. In a tubular member of the class described, a clip arranged upon the outer wall of said member and one end portion of which is positioned in an aperture formed in said member, means for retaining the clip against displacement from said member, a spring positioned in said aperture to cooperate with said end of the clip, and means insertable into said tubular member for placing said spring under tension and for retaining the same against displacement.

9. In a tubular member of the class described, a clip arranged upon the outer wall of said member and one end portion of which is positioned in an aperture formed in said member, means for retaining the clip against displacement from said member, a spring positioned in said aperture to cooperate with said end of the clip, means insertable into said tubular member for placing said spring under tension and for retaining the same against displacement and said spring being substantially U-shaped in form and the crosshead thereof being arranged adjacent the retaining means of said clip.

10. In a tubular member of the class described, a clip arranged upon the outer wall of said member and one end portion of which is positioned in an aperture formed in said member, means for retaining the clip against displacement from said member, a spring positioned in said aperture to cooperate with said end of the clip, means insertable into said tubular member for placing said spring under tension and for retaining the same against displacement, said spring being substantially U-shaped in form and the crosshead thereof being arranged adjacent the retaining means of said clip, and said second named means involving a plug body, the outer wall of which is recessed to receive part of said spring.

11. In a tubular member of the class described, a clip arranged upon the outer wall of said member and one end portion of which is positioned in an aperture formed in said member, means for retaining the clip against displacement from said member, a spring positioned in said aperture to cooperate with said end of the clip, means insertable into said tubular member for placing said spring under tension and for retaining the same against displacement, said spring being substantially U-shaped in form and the crosshead thereof being arranged adjacent the retaining means of said clip, said second named means involving a plug body, the outer wall of which is recessed to receive part of said spring, and said plug body also serving to prevent displacement of said clip retaining means.

12. The combination with a clip of the class described, of a mounting member passed through the clip and forming an axis therefor, the end portions of said member projecting to operatively engage the support of the clip, and a spring arranged on said member and cooperating with one end portion of the clip to hold the other end portion thereof in predetermined position.

13. A clip unit of the class described comprising an elongated clip body, a mounting member extending transversely through said body and forming an axis therefor, the ends of said member projecting beyond said body and a spring cooperating with said member and arranged to engage one end portion of said body.

In testimony that I claim the foregoing as my invention I have signed my name this 21st day of December, 1928.

CLINTON E. MARSHALL.